(12) United States Patent
Qiu et al.

(10) Patent No.: US 10,986,060 B2
(45) Date of Patent: Apr. 20, 2021

(54) CONTEXT AND TIME PREDICTION BASED MESSAGE RECOMMENDATION SYSTEM

(71) Applicant: Microsoft Technology Licensing, LLC, Redmond, WA (US)

(72) Inventors: Honghao Qiu, Redmond, WA (US); Chao Chen, Redmond, WA (US); Tiancong Zhou, Redmond, WA (US); Yong Xie, Redmond, WA (US); Kevin Carter, Redmond, WA (US); Ke Wang, Redmond, WA (US)

(73) Assignee: Microsoft Technology Licensing, LLC, Redmond, WA (US)

(\*) Notice: Subject to any disclaimer, the term of this patent is extended or adjusted under 35 U.S.C. 154(b) by 0 days.

(21) Appl. No.: 16/189,816

(22) Filed: Nov. 13, 2018

(65) Prior Publication Data
US 2020/0153776 A1 May 14, 2020

(51) Int. Cl.
*H04L 12/58* (2006.01)
*G06N 20/00* (2019.01)
*G06F 9/54* (2006.01)

(52) U.S. Cl.
CPC .............. *H04L 51/26* (2013.01); *G06F 9/542* (2013.01); *G06N 20/00* (2019.01); *H04L 51/02* (2013.01);
(Continued)

(58) Field of Classification Search
CPC ......... G06F 9/542; G06N 20/00; H04L 51/02; H04L 51/22; H04L 51/24; H04L 51/26; H04L 51/34; G06Q 10/10; G06Q 10/107
See application file for complete search history.

(56) References Cited

U.S. PATENT DOCUMENTS 8,392,516 B2 \* 3/2013 Deluca ................. G06Q 10/107
  709/206
9,344,297 B2   5/2016 Shah et al.
(Continued)

FOREIGN PATENT DOCUMENTS

WO   2016020467 A1   2/2016
WO   2018137668 A1   8/2018

OTHER PUBLICATIONS

Bergman, et al., "A Personal Email Assistant", In Technical Report HPL-2002-236, Aug. 22, 2002, pp. 1-22.
(Continued)

*Primary Examiner* — Jerry B Dennison
(74) *Attorney, Agent, or Firm* — Schwegman Lundberg & Woessner, P.A.

(57) ABSTRACT

A messaging system configured for recommending messages is provided. The messaging system machine trains a prediction model associated with a user based on past review and response times for past messages. During runtime, the messaging system generates a predicted user action time for each new message based on the prediction model and tags each new message with a corresponding predicted user action time. Based on an amount of available time, the predicted user action time for each new message, and importance for each new message, the messaging system determines a recommended set of new messages that the user should read and respond to during the available time, whereby a sum of the predicted user action time of the recommended set of new messages is equal to or less than the available time. The recommended set of new messages are visually distinguished for the user.

20 Claims, 10 Drawing Sheets

(52) U.S. Cl.
CPC .............. *H04L 51/22* (2013.01); *H04L 51/24* (2013.01); *H04L 51/34* (2013.01)

(56) References Cited

U.S. PATENT DOCUMENTS

| | | | |
|---|---|---|---|
| 9,923,855 B2* | 3/2018 | Kursun | .................. H04L 51/26 |
| 10,257,134 B2* | 4/2019 | Borley | ........... G06Q 10/063118 |
| 2003/0222765 A1* | 12/2003 | Curbow | ............... G06Q 10/109 340/309.7 |
| 2005/0204009 A1* | 9/2005 | Hazarika | .............. G06Q 10/107 709/206 |
| 2010/0211592 A1 | 8/2010 | Brownlee | |
| 2013/0007662 A1 | 1/2013 | Bank et al. | |
| 2013/0046735 A1* | 2/2013 | Tsuchida | ............. G06F 11/1456 707/652 |
| 2013/0091226 A1* | 4/2013 | Brdiczka | ................ G06Q 50/01 709/206 |
| 2013/0346525 A1 | 12/2013 | Chen et al. | |
| 2015/0039703 A1* | 2/2015 | Kursun | .................. H04L 51/22 709/206 |
| 2015/0039705 A1* | 2/2015 | Kursun | .................. H04L 51/22 709/206 |
| 2015/0200899 A1 | 7/2015 | Sanketi | |
| 2016/0142359 A1* | 5/2016 | Lock | ....................... H04L 51/24 709/206 |
| 2016/0182428 A1 | 6/2016 | Borley et al. | |
| 2017/0180298 A1 | 6/2017 | Arbajian et al. | |
| 2018/0048595 A1 | 2/2018 | Dotan-cohen et al. | |

OTHER PUBLICATIONS

"International Search Report and Written Opinion Issued in PCT Application No. PCT/US19/059939", dated Jan. 10, 2020, 12 Pages.

* cited by examiner

US 10,986,060 B2

CONTEXT AND TIME PREDICTION BASED MESSAGE RECOMMENDATION SYSTEM

TECHNICAL FIELD

The subject matter disclosed herein generally relates to special-purpose machines that facilitate message recommendations, including computerized variants of such special-purpose machines and improvements to such variants, and to the technologies by which such special-purpose machines become improved compared to other special-purpose machines that facilitate message recommendation. Specifically, the present disclosure addresses systems and methods that train a prediction model, use the prediction model to determine a time prediction for each message, and recommend messages based, in part, on the time prediction.

BACKGROUND

Typically, messaging systems (e.g., e-mail systems, chatting systems) present a user with messages in a chronological order. For example, messages are presented in a descending order based on time of receipt. Usually the only indication that a message may be important is if a sender has indicated that the message should be marked as important (e.g., selected a high priority indicator). This may result in the user being overwhelmed with email and not being able to properly manage their messages or conversations (e.g., based on available time or context).

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) facilitate message management by recommending messages based on time prediction, importance, and context. In accordance with example embodiments, the messaging system runs machine learning predictions over a combination of monitored user activity and user mail data to predict user action time on each message in a real time manner, and show the predicted action time to a user to assist their time management. In some embodiments, the messaging system determines an importance level for each email and recommends or prioritizes messages based on importance and/or amount of time the user has to review messages. In some embodiments, the messaging system also recommends messages based on context. For example, if the user has a meeting in 20 minutes, the messaging system bumps messages related to the meeting to a top of a list of messages to be reviewed. These recommended/prioritized messages may be visually distinguished from other messages (e.g., highlighted).

As a result, one or more of the methodologies described herein facilitate solving the technical problem of message management in a networked system. As such, one or more of the methodologies described herein may obviate a need for certain efforts or computing resources that otherwise would be involved in reviewing and responding to messages. In particular, instead of the user having to scroll through or read every message, example embodiments recommend messages to the user, thus allowing the user to, for example, ignore non-important messages. As a result, resources used by one or more machines, databases, or devices (e.g., within the environment) may be reduced by the reduction of messages that are reviewed by the user. Examples of such computing resources include processor cycles, network traffic, memory usage, data storage capacity, power consumption, network bandwidth, and cooling capacity.

Figure 1:
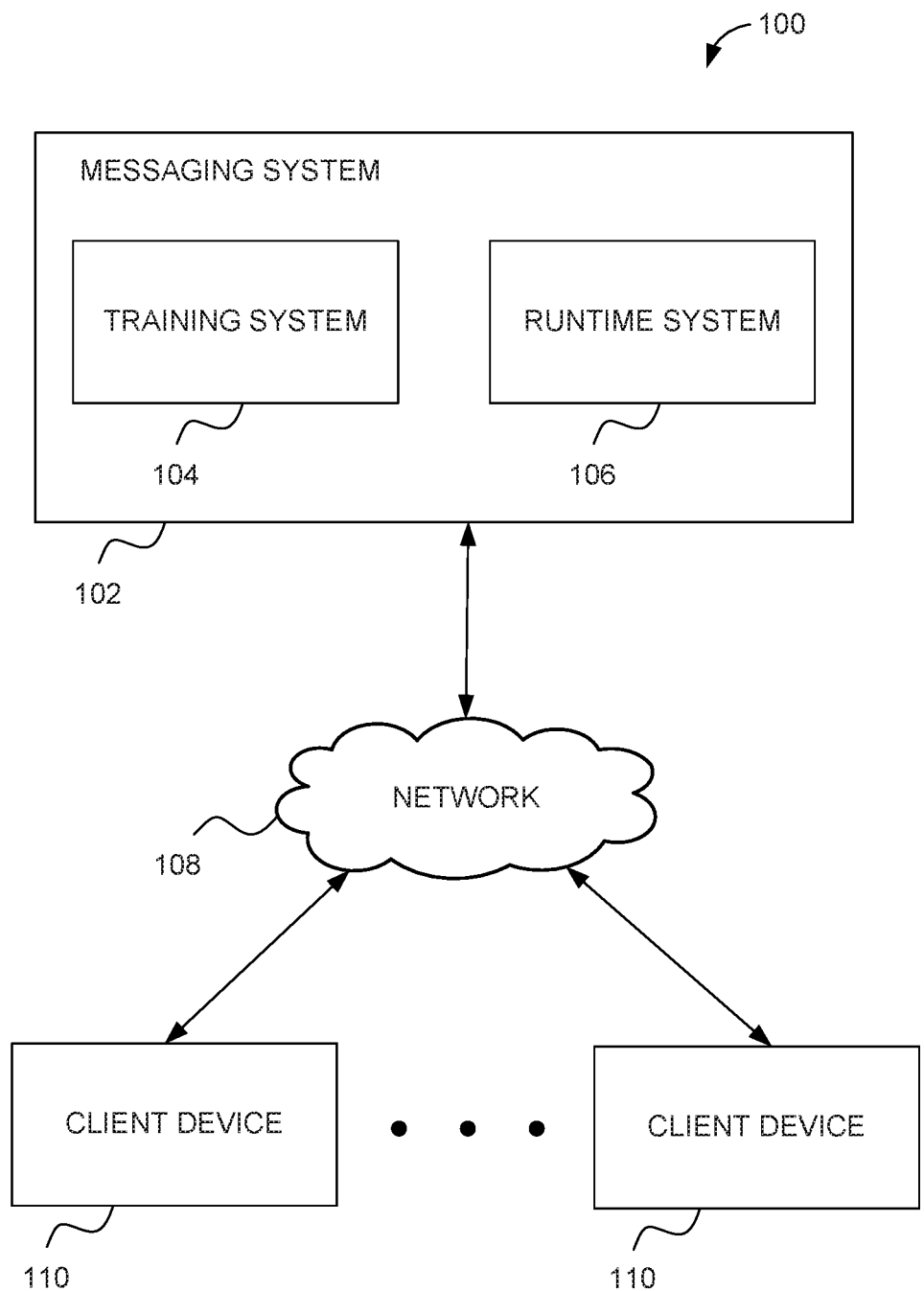
FIG. 1 is a block diagram illustrating an example environment for managing messages by recommending messages based on time prediction, importance, and context in accordance with an example embodiment.

FIG. 1 is a block diagram illustrating an example environment 100 for managing messages using a messaging system 102 that makes recommendations based on time prediction, importance, and context. In example embodiments, the messaging system 102 comprises a training system 104 configured to build and train a prediction model and a runtime system 106 configured to analyze new messages at runtime to determine predicted action time to respond and to rank and recommend messages (e.g., prioritize messages) based on importance and, in some cases, context. The messaging system 102 including the training system 104 and the runtime system 106 will be discussed in more detail in connection with FIG. 2 below.

The messaging system 102 is coupled, via a network 108, to one or more client devices (e.g., client devices 110). One or more portions of the network 108 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 108 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client devices 110 are devices of users used to send and receive messages through the messaging system 102. For example, a user at the client device 110 may, via a specially configured user interface, access their messages. The specially configured user interfaces provide an option to the user to intelligently manage their messages. For example, the user can specify an amount of time they have available to review and respond to messages. In response, the messaging system 102 recommends one or more messages that the user can review and respond to in the given amount of time based on importance and, in some cases, context. In some embodiments, the client devices 110 make calls to the messaging system 102 to cause the presentation of the user interfaces (e.g., obtain the data to display the user interfaces). In alternative embodiments, some of the functions of the messaging system 102 (discussed below) may be performed by comparable components on the client devices 110.

The client devices 110 may comprise, but are not limited to, a smartphone, tablet, laptop, multi-processor system, microprocessor-based or programmable consumer electronics, game console, set-top box, or any other device that a user utilizes to communicate over the network 108. In example embodiments, the client devices 110 comprise a display module (not shown) to display information (e.g., in the form of specially configured user interfaces). In some embodiments, the client devices 110 may comprise one or more of a touch screen, camera, keyboard, microphone, and Global Positioning System (GPS) device.

Any of the systems or machines (e.g., systems, devices, servers) shown in, or associated with, FIG. 1 may include, or otherwise be implemented in, a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 10, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of client devices 110 may be embodied within the environment 100. Furthermore, some components or functions of the environment 100 may be combined or located elsewhere in the environment 100. For example, some of the functions of the messaging system 102 may be embodied within the client device 110.

Figure 2:
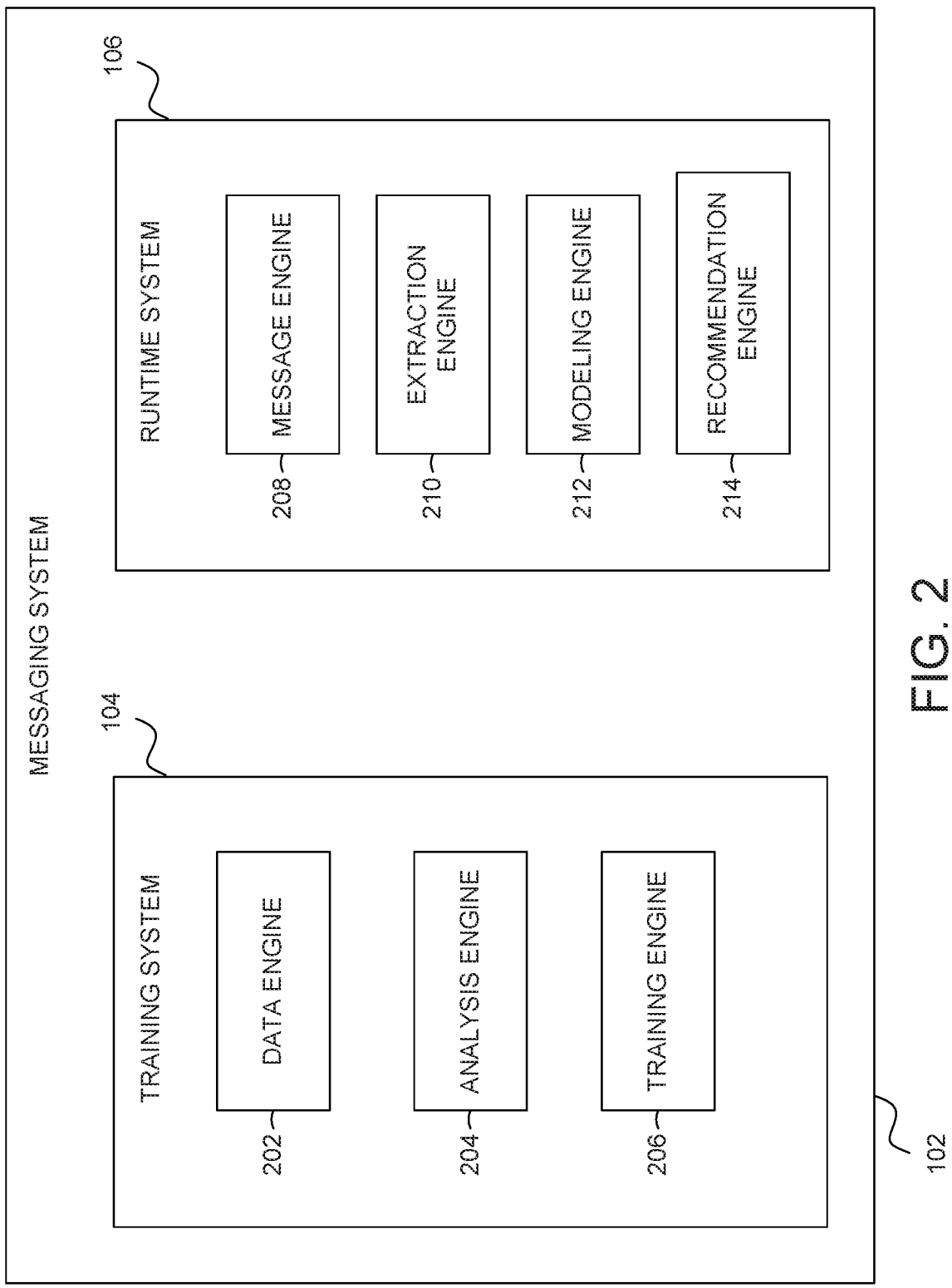
FIG. 2 is a block diagram illustrating components within a messaging system in accordance with an example embodiment.

FIG. 2 is a block diagram illustrating an example embodiment of components within the messaging system 102. In example embodiments, the messaging system 102 performs operations to generated and train a prediction model and to use the prediction model along with monitored user activities to predict time required to address each message and to recommend messages based, for example, on an amount of time available to review messages. To enable these operations, the messaging system 102 comprises the training system 104 and the runtime system 106, each including (or associated with) supporting engines or components all of which are configured to communicate with each other (e.g., over a bus, shared memory, or a switch) in accordance with an example embodiment.

In example embodiments, the training system 104 uses offline and online training based on data extracted from each user's past messages (e.g., e-mails, chats), monitored past activities (e.g., read messages, reply to messages, send messages, ignore messages), and user's relationship with others (e.g., a report line such as a direct manager, frequent correspondent). After a prediction model is trained and achieves an acceptable accuracy, the model is provided to the runtime system 106 and used to analyze incoming messages, as will be discussed in more detail below. In example embodiments, the prediction model is regularly updated (e.g., once a week) based on past data (e.g., including latest one week of data). To enable these operations, the training system 104 comprises a data engine 202, an analysis engine 204, and a training engine 206.

The data engine 202 manages data used to train the prediction model. In example embodiments, the data engine 202 extracts the data by querying user activity (e.g., querying Exchange Substrate services) and message storage services. For example, the data engine 202 uses MARS (Exchange Map Reduce System) to extract raw data for each message. The raw data comprises, for example, user identifier, message identifier, message body length, "at mentioned" or not (e.g., was the user mentioned in the message), whether message is marked as high importance or not, whether the message was sent to a distribution list or not, and so forth. The raw data is provided to the analysis engine 204 for processing.

The data engine 202 also detects information used to generate properties that are ground truths for each user. In example embodiment, when the user clicks buttons or selects a message on a message client (e.g., Outlook), the data engine 202 captures corresponding signals. For example, when the user selects a message to read, the data engine detects a reading pane start signal. Similarly, when the user finishes reading the message (e.g., by a selection to close the message), the data engine 202 detects a reading pane end signal. In another example, the data engine detects when the user clicks on a compose message button (e.g., reply, reply all, forward, or new message selection/button) and when the user clicks send—capturing this information as signals.

The analysis engine 204 processes the raw data and signals for model training. In example embodiments, the analysis engine 204 computes features (e.g., computing bucketed feature values such as message body length, whether user is mentioned in message, whether sender is in report line, whether sender is frequent correspondent, whether message is marked as high importance, user triage pattern (e.g., historical action distribution), historical respond speed, predicted focused ratio of the mail) and labels (reading and reply time for each message for each user) that may be needed as inputs for model training. Further still, the analysis engine 204 removes outlier data to de-noise the input stream of raw data and removes duplicate data or partial data if there is any. In some embodiments, the analysis engine 204 determines people relationship scores, which is input into the prediction model to predict user action time. For example, if the sender is someone the user normally corresponds with or is a direct manager, the analysis engine 204 applies a higher score as compared to someone who the user rarely responds to or has never responded to.

In example, embodiments, the analysis engine 204 uses the captured signals to compute actual action time for each message. For example, the reading pane start signal and the reading pane end signal are analyzed by the analysis engine 204 to generate a view message signal which captures how long the user stayed on each message. Similarly, the analysis engine 204 uses the compose message signal and the send signal to determine a compose message signal that captures how long it took for the user to compose each message. In a further example, the reading pane start signal and the send signal may be used to determine a reading/replying signal (e.g., capturing how long it took the user to read and reply to a message). These further signals (e.g., view message signal, compose message signal, reading/replying signal) are referred to as "ground truth labels."

The training engine 206 generates and trains the prediction model. In example embodiments, based on user readership/reply distribution, the training engine 206 clusters users into multiple categories (e.g., users that are heavy message users, users that rarely interact with messages). For each category, the training engine 206 trains a prediction model (e.g., a SVM regression model) by taking input features (e.g., user identifier, message identifier, user read time, user reply time, message body length, people relationship score, "at mentioned" or not, whether messages are marked as high importance or not, whether a message was sent to a distribution list or not, in focused inbox or not) for all the users in the category and predicts a total action time needed for each message for the users in each category (e.g., using tensorflow SVM regression package).

In example embodiments, the training engine 206 uses one or more of the monitored actual action times (e.g., signals) determined by the analysis engine 204 for each message. This gives the training engine 206 a ground truth label that is compared with the predicted action time. In one embodiment, a loss function is determined using an L2 norm of a total distance between the predicted action time and the ground truth label (e.g., actual read plus reply time if any) for all message for all users in a particular category. The training engine 206 attempts to reduce this loss function.

In some embodiments, the training engine 104 trains a prediction model for each specific user. For example, the user may initially be clustered into one of the categories. Once a prediction model is trained for the category (or the prediction model for the category is determined to be applicable for the user), the user's individual action time/ground truth label is compared to the predicted action time to determine the loss function. The training engine 104 then attempts to train the prediction model to reduce the loss function for the user individually. Thus, the prediction model comprises a set of parameters based on the labels associated with the user.

After obtaining a reasonable prediction accuracy, the training engine 206 places the prediction model into use in the meantime system 106. Each incoming message is then analyzed using the prediction model to predict an action time to respond to the message. The runtime system 106 also ranks and prioritizes the messages based on importance and/or context. In some cases, the runtime system 106 recommends one or more messages to the user based on an amount of available time the user has (e.g., specified by the user or detected by the runtime system 106). To enable these operations, the runtime system 106 comprises a message engine 208, an extraction engine 210, a modeling engine 212, and a recommendation engine 214.

The message engine 208 manages new messages at the messaging system 102. The message engine 208 is a message entity that stores information for each message. In example embodiments, the message engine 208 receives the messages, determines a recipient, and routes the messages accordingly (e.g., to a proper Outlook client).

When the message engine 208 receives a new message, the message engine 208 automatically triggers the extraction engine 210 (e.g., a Griffin real time reactive processor—GASv2 processor) to extract message properties from the new message. The extracted properties are, in some embodiments, received as part of the property of the message (e.g., in a header), so it is defined in a schema. In example embodiments, the extraction engine 210 extracts message features or properties (e.g., user identifier, message identifier, message body length, "at mentioned" or not, whether messages are marked as high importance or not, whether message was sent to a distribution list or not, in focused inbox or not) from the new message. The extracted message features are then provided to the modeling engine 212.

The modeling engine 212 takes the message properties as inputs and applies the prediction model to determine a predicted user action time for the new message. The predicted user action time is a predicted amount of time that the messaging system 102 believes it will take the user to read the message and perform a corresponding action (e.g., reply to the message, close the message). In example embodiments, the modeling engine 212 detects the message features extracted for the new message and obtains a corresponding value for each feature. Each value is computed in real time. For example, as the message arrives, the training system 104 "listens" to message arrival event(s) and extracts the relevant information that is needed based on corresponding logic code to compute the value. The modeling engine 212 then multiplies the message feature's value with a corresponding parameter of the prediction model. For example, an algorithm used to predict the action time may be: (parameterA×feature1)+(parameterB×feature 2)+ . . . , where, for example, feature1 is a value corresponding to how long the message is, feature2 is a value corresponding to whether the user is mentioned in the message, feature3 is a value corresponding to whether the sender is in the report line, and so forth. A result is the predicted user action time for the new message. In example embodiments, the modeling engine 212 runs in sub-second (e.g., near real-time manner).

The modeling engine 212 sends the result back to the message engine 208 which attaches the predicted user action time to the message (e.g., as another property of the message). In some embodiments, the message engine 208 also causes display of the predicted time to the user.

In some embodiments, the modeling engine 212 also generates a next action prediction. Thus, for a particular user, the modeling engine 212 determines a probability that the user, in general, will read a message and/or reply to or forward the message. For example, a heavy message reader will have a higher next action prediction that the heavy message reader will read the message.

The recommendation engine 214 facilitates message prioritization and recommendations. In example embodiments, the recommendation engine 214 ranks the new messages based on importance (e.g., message importance prediction). Importance of a message is based on features/properties such as whether the message is marked as important, whether the message is from a manager, whether the message is from a sender the user regularly communicates for, and so forth. In one embodiment, the recommendation engine 214 makes an API call to a separate system that determines an importance of each message based on the features/properties of each of the messages.

In embodiments where a user specifies an amount of time they are available for reviewing and responding to messages (e.g. 30 minutes), the recommendation engine 214 leverages the message importance prediction and user action predicted time for each message, and filters out a top number of one or more messages for the user, where a total time needed for the recommended messages is within the user specified available time. In these embodiment, the runtime system 106 (e.g., the message engine 208) distinguishes these recommended messages by pinning them to a top of a message list or visually distinguishing these messages (e.g. marking message tab red). In embodiments where a message is important but will exceed the amount of available time established by the user, the recommendation system 214 bumps the message up in priority, but does not visually distinguish the message (e.g., does not highlight the message).

In some embodiment, the recommendation engine 214 performs a time-based prediction on other aspects of the message and gives a context-based message recommendation. Thus, when the user enables a time and context-aware view of messages, the recommendation engine 214 performs a context-based recommendation process to pin contextual-aware messages to the top of the list during a particular timeframe. In various embodiments, the context-based recommendations can be based on one or more of location awareness, time awareness, artifact awareness, and people awareness.

Location awareness considers a location (e.g., airport, hotel, home) of the user at a particular time or a location the user will be traveling to within a particular timeframe (e.g., in the next 30 minutes) and prioritizes messages related to these locations during the predicted timeframe that user is traveling to these locations. For example, if the user has a flight in an hour, the recommendation engine 214 identifies messages related to a corresponding trip (e.g., flight message, hotel message) and prioritize these messages on the list. In one embodiment, the recommendation engine 214 knows the user's location based on a calendar or virtual assistant (e.g., Cortana) which manages time and event reminders (e.g, based on time to leave feature).

Time awareness considers upcoming meetings and prioritizes messages associated with these meetings. For example, meeting topic-related messages during a predicted timeframe that the user is preparing for the meeting (e.g., within an hour of the meeting) are prioritized.

Artifact awareness considers user actions with respect to documents. In these embodiments, if a user closes a specific document, document-related messages (e.g., with the same or similar document/attachment) are prioritized.

People awareness considers senders of messages. In some cases, messages from senders that are related to a meeting that the user will be attending soon are prioritized. For example, messages from a meeting organizer of a next meeting the user has (e.g., in an hour) is prioritized on the list. In another embodiment, messages from a direct manager or the user's significant other are also prioritized.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The scheduling system 102 may comprise other components not pertinent to example embodiments that are not shown or discussed. Further still, one or more of the components of the scheduling system 102 may be located at one or more of the client devices.

Figure 3:
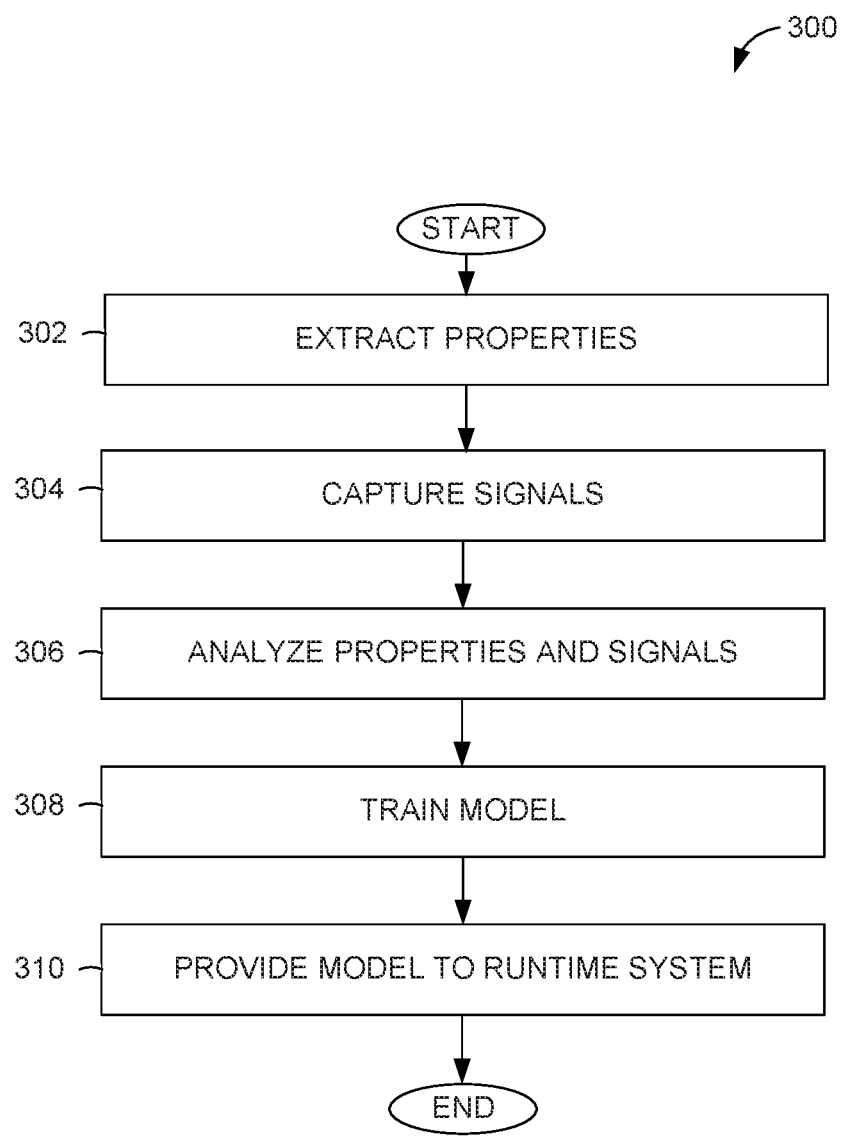
FIG. 3 is a flow diagram of an example method for training a prediction model in accordance with an example embodiment.

FIG. 3 is a flow diagram of an example method 300 for training a prediction model in accordance with an example embodiment. Operations in the method 300 may be performed by the messaging system 102 (e.g., the training system 104), using components (e.g., modules, engines) described above with respect to FIG. 2. In example embodiments, the operations are performed offline and repeated periodically (e.g., weekly) using updated data to maintain a current prediction model for each category or user. Accordingly, the method 300 is described by way of example with reference to the messaging system 102. However, it shall be appreciated that at least some of the operations of the method 300 may be deployed on various other hardware configurations or be performed by similar components residing elsewhere. For example, some of the operations may be performed at the client devices 110.

In operation 302, the data engine 202 extracts properties used to train the prediction model. In example embodiments, the data engine 202 extracts the data by querying user activity and message storage services and extracting raw data associated with each message. The raw data comprises, for example, user identifier, message identifier, message body length, people relationship score (e.g., is the sender someone the user normally corresponds with or a direct manager). "at mentioned" or not e.g., was the user mentioned in the message), whether message is marked as high importance or not, whether the message was sent to a distribution list or not, and so forth.

In operation 304, the data engine 202 captures signals used to generate properties that are ground truths for each user. In example embodiment, when the user makes a selection on a message user interface (e.g., clicks buttons) or selects a message on a message client (e.g., Outlook) to read, the data engine 202 captures corresponding signals such as, for example, a reading pane start signal, a reading pane end signal, and a compose message signal.

In operation 306, the analysis engine 204 analyzes properties and signals for model training. In example embodiments, the analysis engine 204 computes features (e.g., computing bucketed feature values) and labels (e.g., reading and reply time for each message for each user) that may be needed as inputs for model training by the training engine 206. In some embodiments, the analysis engine 204 also determines people relationship scores. Furthermore, the analysis engine 204 uses the captured signals to compute actual action time for each message (e.g., a view message signal which captures how long the user stayed on a message, a compose message signal that captures how long it took for the user to compose a message, a reading/replying signal that captures how long it took the user to read and reply to a message). These further signals (e.g., the view message signal, the compose message signal, the reading/replying signal) are referred to as "ground truth labels."

In operation 308, the training engine 206 trains a prediction model (e.g., a regression model). In some cases, the training engine 206 generates the prediction model while in other cases, the training engine 206 updates an existing prediction model. A different prediction model can be associated with each category that clusters users having a similar message profile (e.g., quickly replies to messages, slow reader) or be associated with individual users, in category embodiments, based on user readership/reply distribution, the training engine 206 clusters users into categories (e.g., users that read slow, users that reply quickly). For each category, the training engine 206 trains the prediction model using input features (e.g., user identifier, message identifier, message body length, people relationship score, "at mentioned" or not, whether messages are mark as high importance or not, whether message was sent to a distribution list or not, in focused inbox or not) and predicts a total action time needed for each message for the users in each category.

In example embodiments, the training engine 206 uses one or more of the monitored actual action times (e.g., signals) determined by the analysis engine 204 (e.g. ground truth labels) for each message. In one embodiment, a loss function is determined using a L2 norm of a total distance between the predicted action time and the ground truth label (e.g., actual read plus reply time if any) for all message for all users in a particular category. The training engine 206 attempts to reduce the loss function when training the prediction model.

In user specific embodiments, the training engine 206 trains a prediction model for each specific user. For example, the user may first be clustered into one of the categories. Once a prediction model is trained for the category, the user's individual action time/ground truth label is compared to the predicted action time for the category to determine the loss function. The training engine 206 then attempts to train the prediction model, on an individual basis, to reduce the loss function for the specific user.

In operation 310, the trained model is provided to the runtime system 106. This occurs after the training engine 206 obtains a reasonable prediction of accuracy (e.g., the loss function is within a threshold value).

Figure 4:
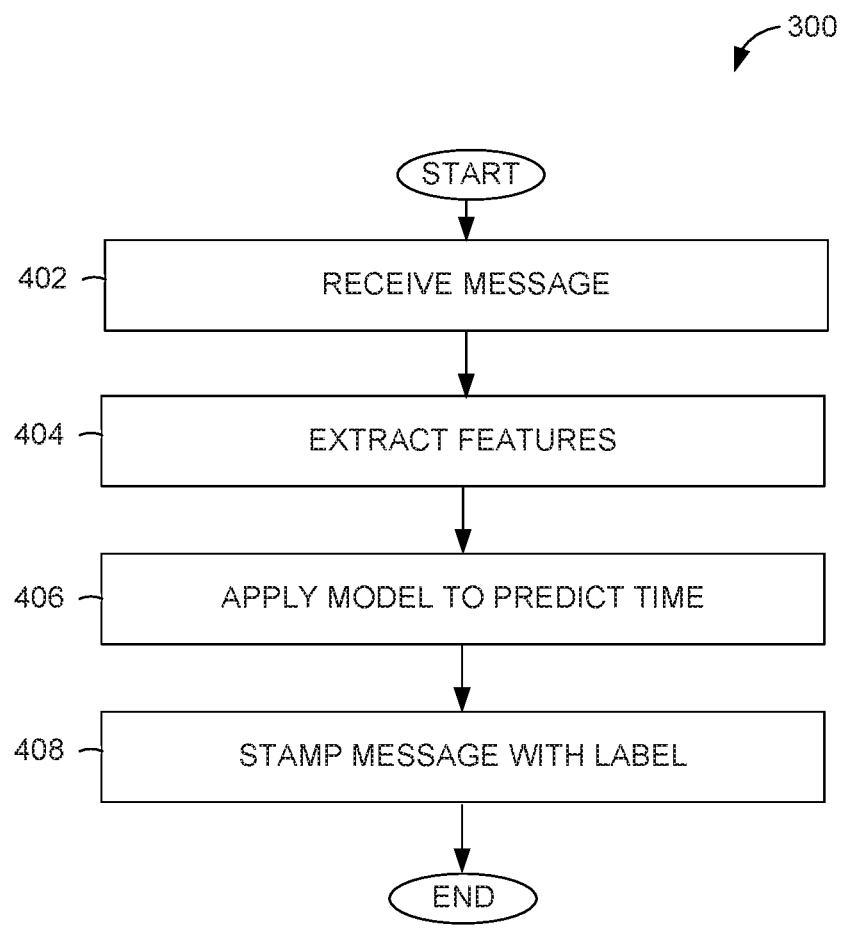
FIG. 4 a flow diagram of an example method for labeling messages with time prediction in accordance with example embodiments.

FIG. 4 a flow diagram of an example method 400 for labeling messages with time prediction in accordance with example embodiments. Operations in the method 400 may be performed by the messaging system 102, using components (e.g., modules, engines) described above with respect to FIG. 2. Accordingly, the method 400 is described by way of example with reference to the messaging system 102. However, it shall be appreciated that at least some of the operations of the method 400 may be deployed on various other hardware configurations or be performed by similar components residing elsewhere. For example, some of the operations may be performed at the client devices 110.

In operation 402, the message engine 208 receives a new message. When the message engine 208 receives the new message, the message engine 208 automatically triggers the extraction engine 210 to perform extraction processing.

In operation 404, the extraction engine 210 extracts message features/properties from the new message. In some embodiments, the extraction engine 210 extracts message information such as message content (e.g., header, body) and sender of message, along with other message properties (e.g., has attachment or not, marked as high importance or not, user being mentioned in the message or not). The extraction engine 210 then extracts message features based on this information.

In operation 406, the modeling engine 212 applies the prediction model corresponding to the user (e.g., message recipient) to predict user action time. The modeling engine 212 takes the message features from the extraction engine 210 as inputs and applies the prediction model. The result is the predicted user action time for the message. The modeling engine 212 sends the result back to the message engine 208.

In operation 408, the message engine 208 stamps the message with a label indicating the predicted user action time. In example embodiments, the predicted user action time is attached to the message as another property of the message.

Figure 5:
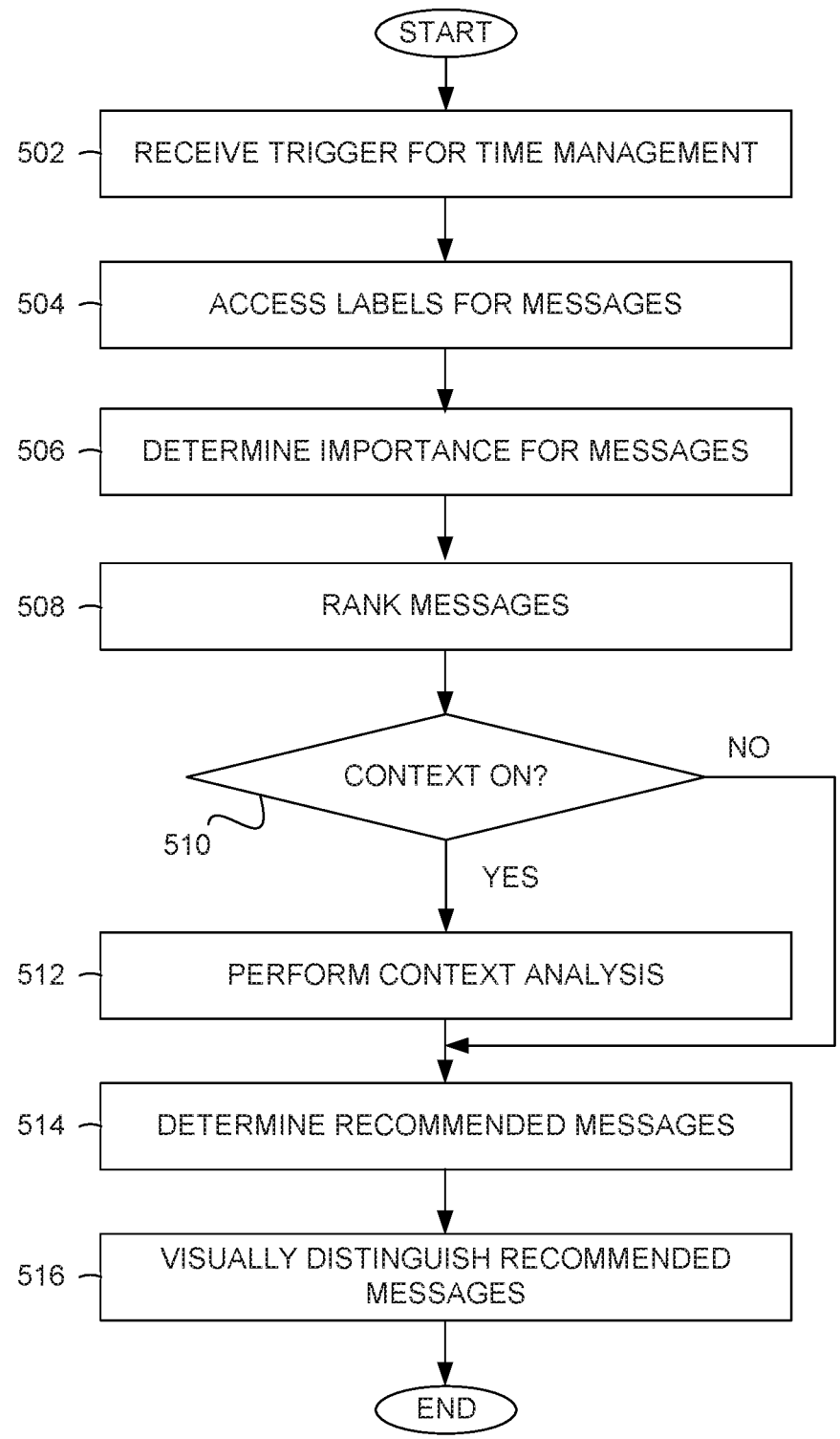
FIG. 5 is a flow diagram of an example method for presenting prioritized message based on context and time prediction in accordance with example embodiments.

FIG. 5 is a flow diagram of an example method 500 for presenting prioritized message based on time prediction and context in accordance with example embodiments. Operations in the method 500 may be performed by the messaging system 102 (e.g., runtime system 106), using components (e.g., modules, engines) described above with respect to FIG. 2. Accordingly, the method 500 is described by way of example with reference to the messaging system 102. However, it shall be appreciated that at least some of the operations of the method 500 may be deployed on various other hardware configurations or be performed by similar components residing elsewhere. For example, some of the operations may be performed at the client devices 110.

In operation 502, the messaging system 102 receives a trigger activating time management message recommendations for the user. For example, the user selects a "smart time" icon on their messaging user interface. The user may also specify an amount of time that they are available for reading and replying to messages. The activation of the time management recommendation option causes the messaging system 102 to recommend messages based on available time and importance of messages. In some cases, the user may also activate a context-based recommendation trigger that enables recommendations based on both time availability, importance, and context of messages.

In operation 504, the recommendation engine 214 accesses labels indicating the predicted action time for the messages of the user. Thus, the recommendation engine 214 identifies a predicted user action time for each new (e.g., unread) message.

In operation 506, the recommendation engine 214 determines an importance prediction for each the messages. In one embodiment, the recommendation engine 214 makes an API call to a separate system that determines the importance of each message based on the features/properties of each of the messages (e.g., marked as important or are associated with a high value relationship, such as from manager or spouse). In other embodiments, the recommendation engine 214 performs the determination of importance of each message.

In operation 508, the recommendation engine 214 ranks the messages in terms of their importance. Thus, when the user enables a time-aware (e.g., smart management) view of messages, the recommendation engine 214 performs a recommendation process to pin the most important messages that the user can read (and in some cases respond to) in the indicated available amount of time to the top of the list.

In operation 510, the messaging system 102 determines whether a context-based recommendation trigger was received, for example, in operation 502. If the context-based recommendation trigger is received, the recommendation engine 214 performs a context-based analysis of the messages in operation 512. In various embodiments, context based recommendations can be based on one or more of location awareness, time awareness, artifact awareness, and people awareness.

In some cases, the recommendation engine 214 accesses a scheduling assistant (e.g., in a calendar or scheduling application of a scheduling system) to identify upcoming appointments or events. Using the upcoming appointments and events, the recommendation engine 214 identifies messages that are related to (e.g., indicate in subject line or content of message) the upcoming appointments and events.

In operation 514, the recommendation engine 214 determines the recommended/prioritized messages. In embodiments where a user specifies an amount of time they are available for reviewing and responding to messages (e.g. 30 minutes), the recommendation engine 214 leverages the message importance prediction and user action predicted time for each message, ranks the messages based on importance and user action predicted time in view of the indicated available time, and determines a top number of one or more messages for the user, where a total time needed for the recommended messages is within the user specified available time. In embodiments where the context-based recommendation trigger is also activated, the recommendation engine 214, in some embodiments, takes the ranked messages (based on importance and user action predicted time in view of the indicated available time) and further filters (e.g., selects the messages that are contextually the most important) these messages based on context (e.g., location awareness, time awareness, artifact awareness, and people awareness).

In operation 516, the prioritized messages are visually distinguished (or caused to be visually distinguished) on a specially configured user interface displayed to the user. In these embodiment, the runtime system 106 (e.g., the message client 208) distinguishes these recommended messages by pinning them to a top of a message list or visually distinguishing these messages (e.g. marking message tab red).

Figure 6:
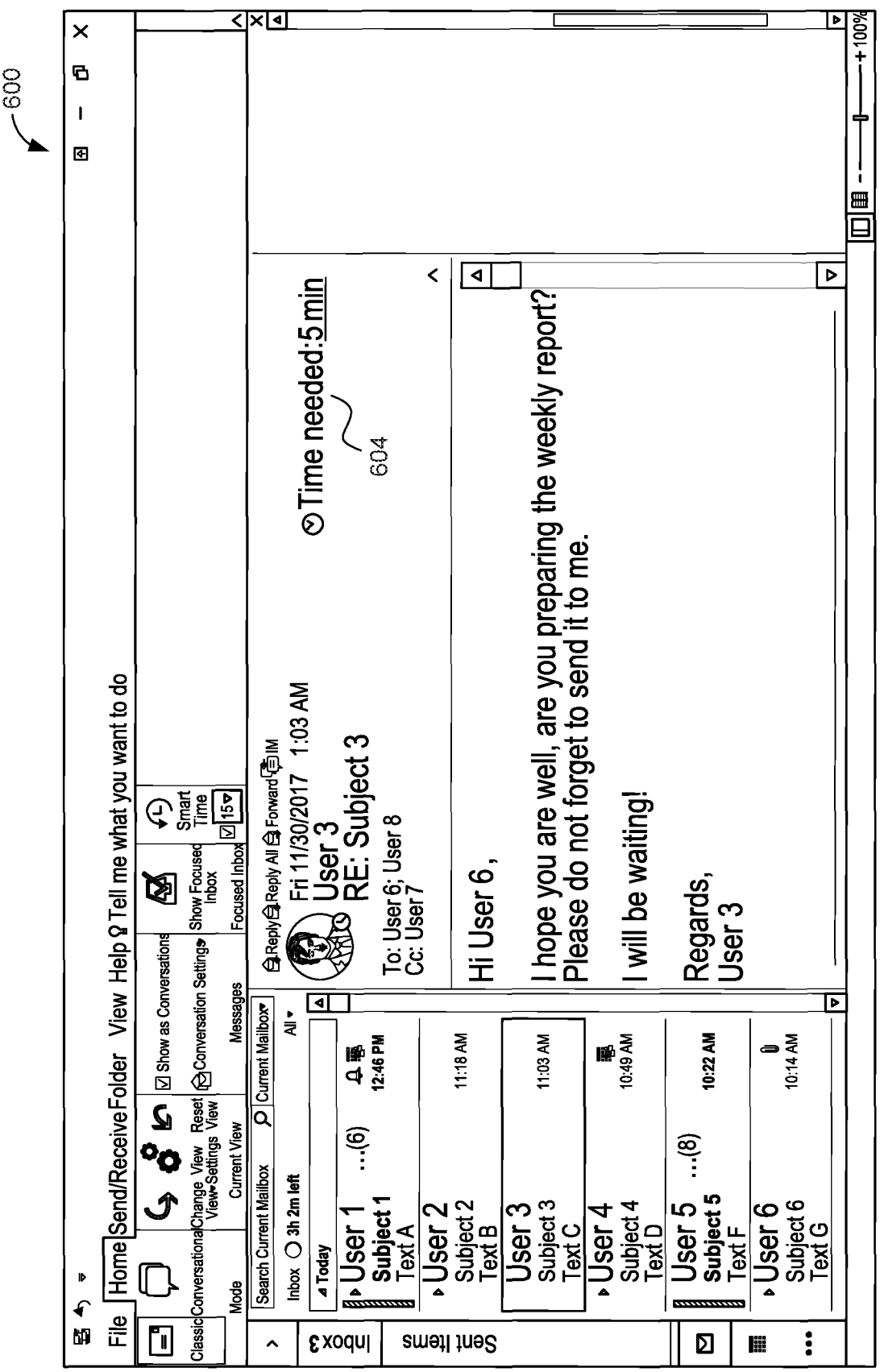
FIG. 6 illustrates an example screenshot of a message user interface showing a labeled message.

FIG. 6 illustrates an example screenshot of a message user interface showing a labeled message 600. The labeled message 600 includes a predicted user action time "label" 604 that indicates an amount of time predicted for the user to read and, in some cases, respond to the message. In the present example, the predicted user action time is 5 minutes.

Figure 7:
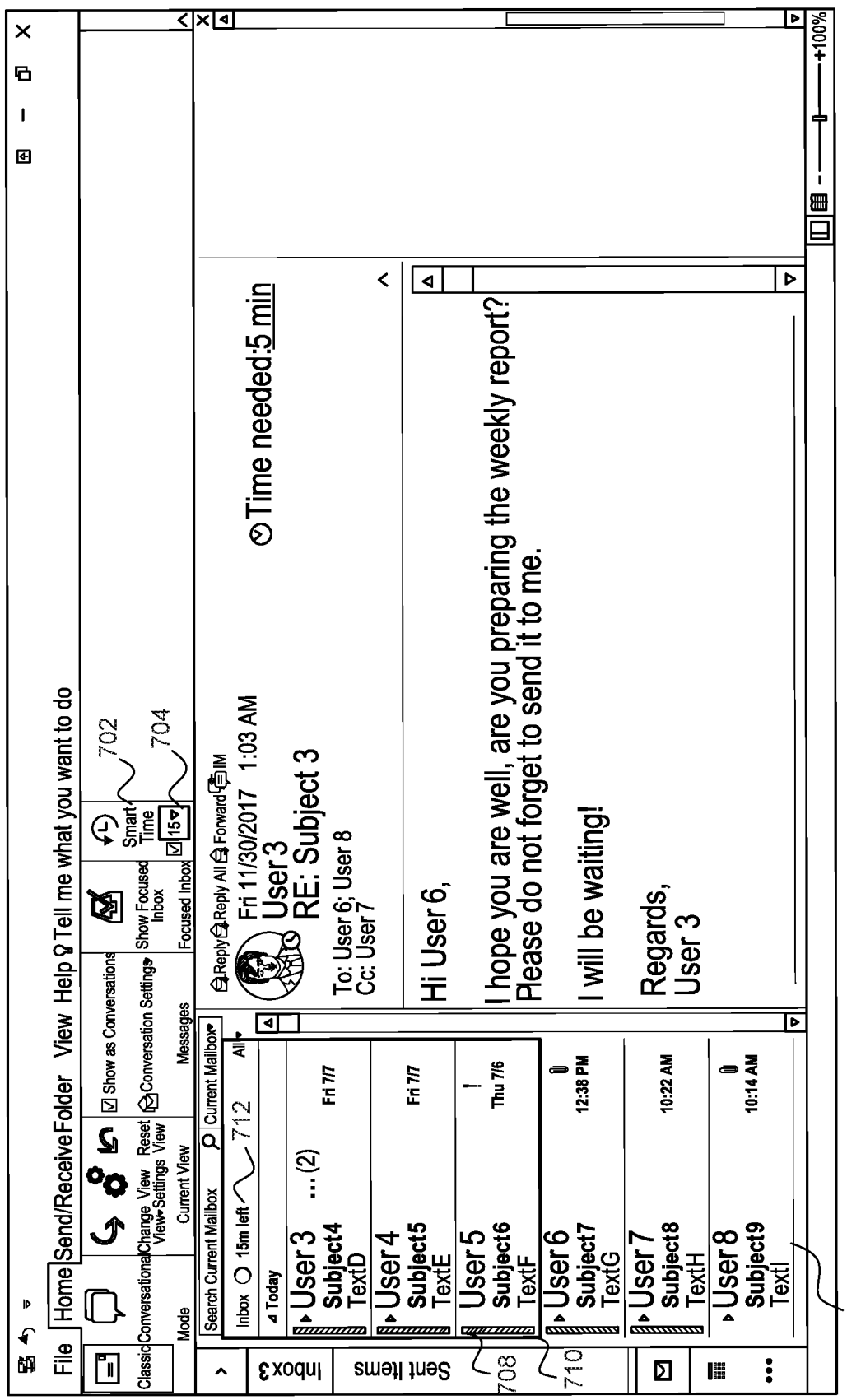
FIG. 7 illustrates an example screenshot of the message user interface showing prioritized emails.

FIG. 7 illustrates an example screenshot of the message user interface showing prioritized messages. In the example of FIG. 7, the user has triggered a smart time selection 702 that triggers smart time management of messages. The smart time selection 702 includes a field 704 to input an amount of available time the user has to read and respond to messages. In some embodiments, the field 704 comprises a drop down menu from which the user selects an available amount of time. In other embodiments, the field 704 comprises an input field where the use can specify (e.g., enter) the available amount of time. In the present example, the user has indicated that they have 15 minutes to read and respond to messages.

In response to activation of the smart time selection 702, the messaging system 102 (e.g., the recommendation engine 214) determines the most important messages that the user can respond to in the indicated amount of available time. As shown, the recommendation engine 214 identified three messages and elevated them to a top of a message list 706. The three recommended messages are visually distinguished (e.g., each indicated with a red unread bar 708 and/or encircled in a red box 710) from non-recommended messages (e.g., shown below on the message list 706). An estimated amount of time 712 (e.g., 15 minutes) to review the recommended messages is also displayed to the user.

Figure 8:
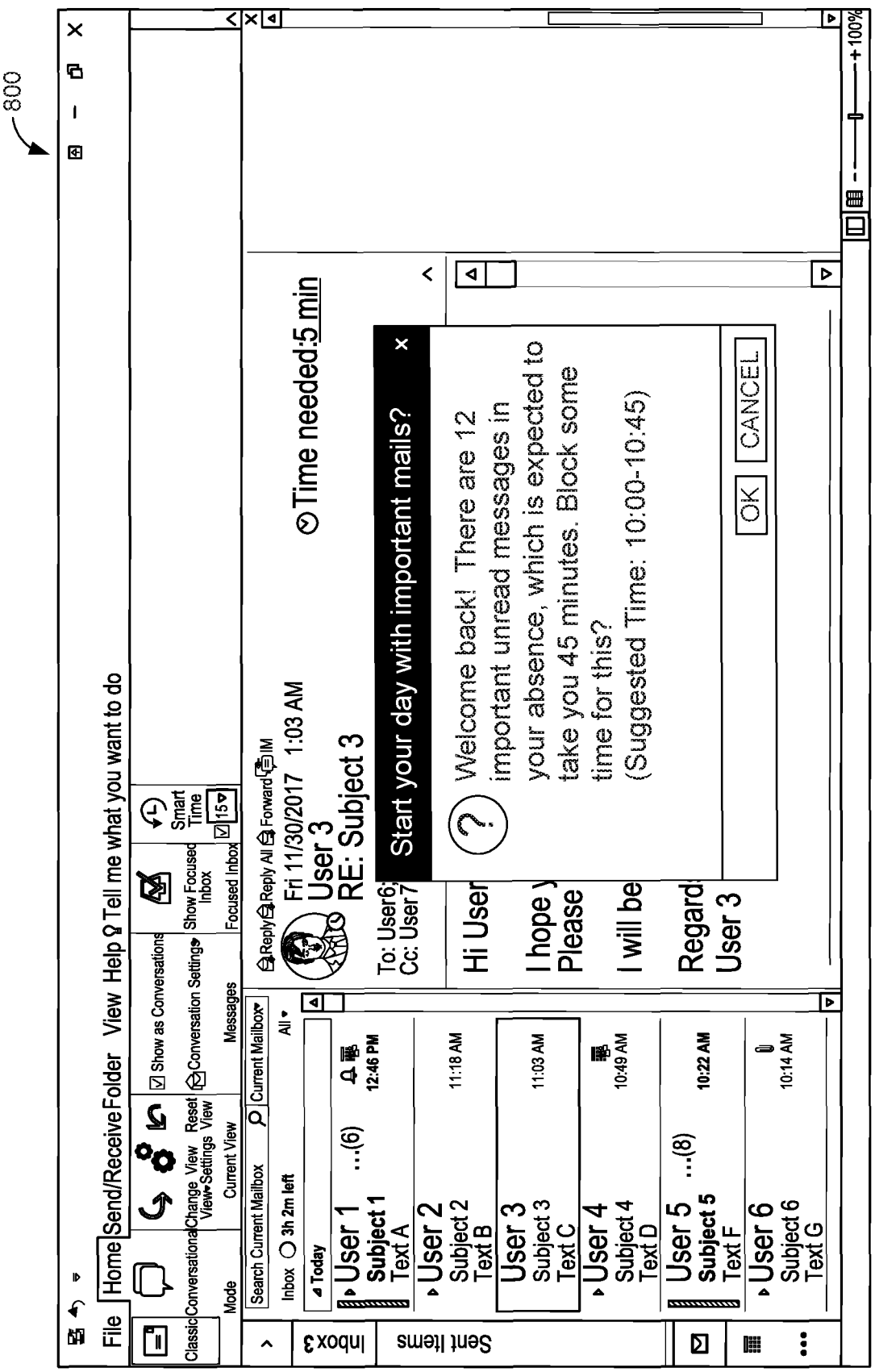
FIG. 8 illustrates an example screenshot of the message user interface showing a time allocation interface.

FIG. 8 illustrates an example screenshot of the message user interface showing a time allocation interface 800. In some embodiments, the recommendation engine 214 provides a notification in the time allocation interface 800 when a user activates a messaging system (e.g., activates an e-mail system) after an extended amount of time or upon startup. The time allocation interface 800 indicates a number of important unread messages and an estimated amount of time needed to review these important unread messages. The time allocation interface 800 may also suggest a timetrame that the user may want to review these messages. The timeframe is determined, for example, based on the messaging systems awareness of calendared events (e.g., meetings) scheduled for the user. If the user selects to block time (e.g., during the indicated timeframe) for reviewing the important messages, the messaging system 102 "schedules" the review time in the user's calendar.

Figure 9:
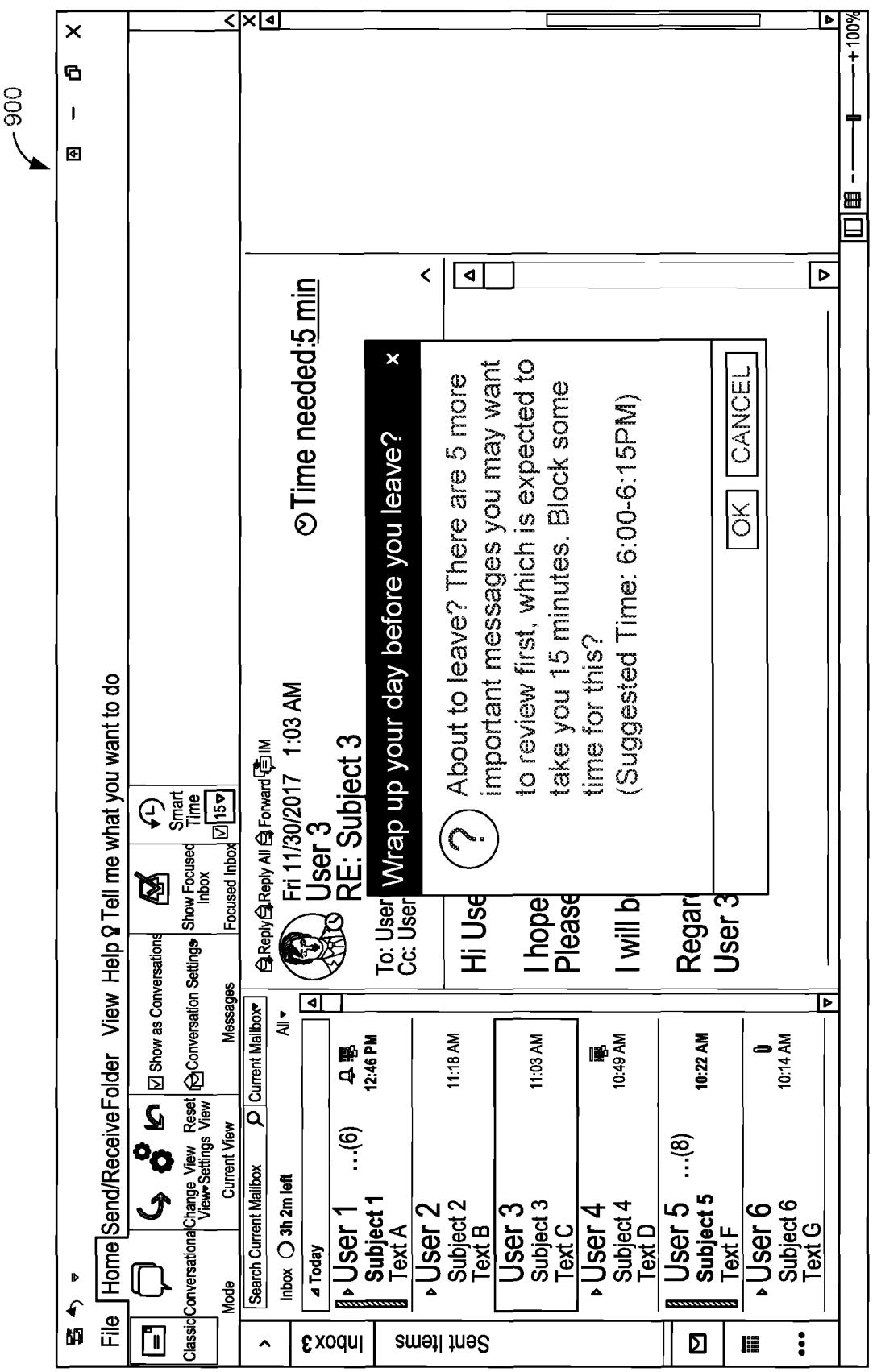
FIG. 9 illustrates an example screenshot of the message user interface showing an alternative time allocation interface.

FIG. 9 illustrates an example screenshot of the message user interface showing an alternative time allocation interface 900. The alternative time allocation interface 900 is provided at an end of a work day or when the user attempts to close a messaging application (e.g., close the email application). The alternative time allocation interface 900 provides an indication of a number of important messages that are still unread. The alternative time allocation interface 900 also indicates a predicted amount of time that may be needed to read and respond to the remaining unread important messages. In some embodiments, the alternative time allocation interface 900 may also suggests one or more timeframes during which the user may want to review these unread important messages.

Figure 10:
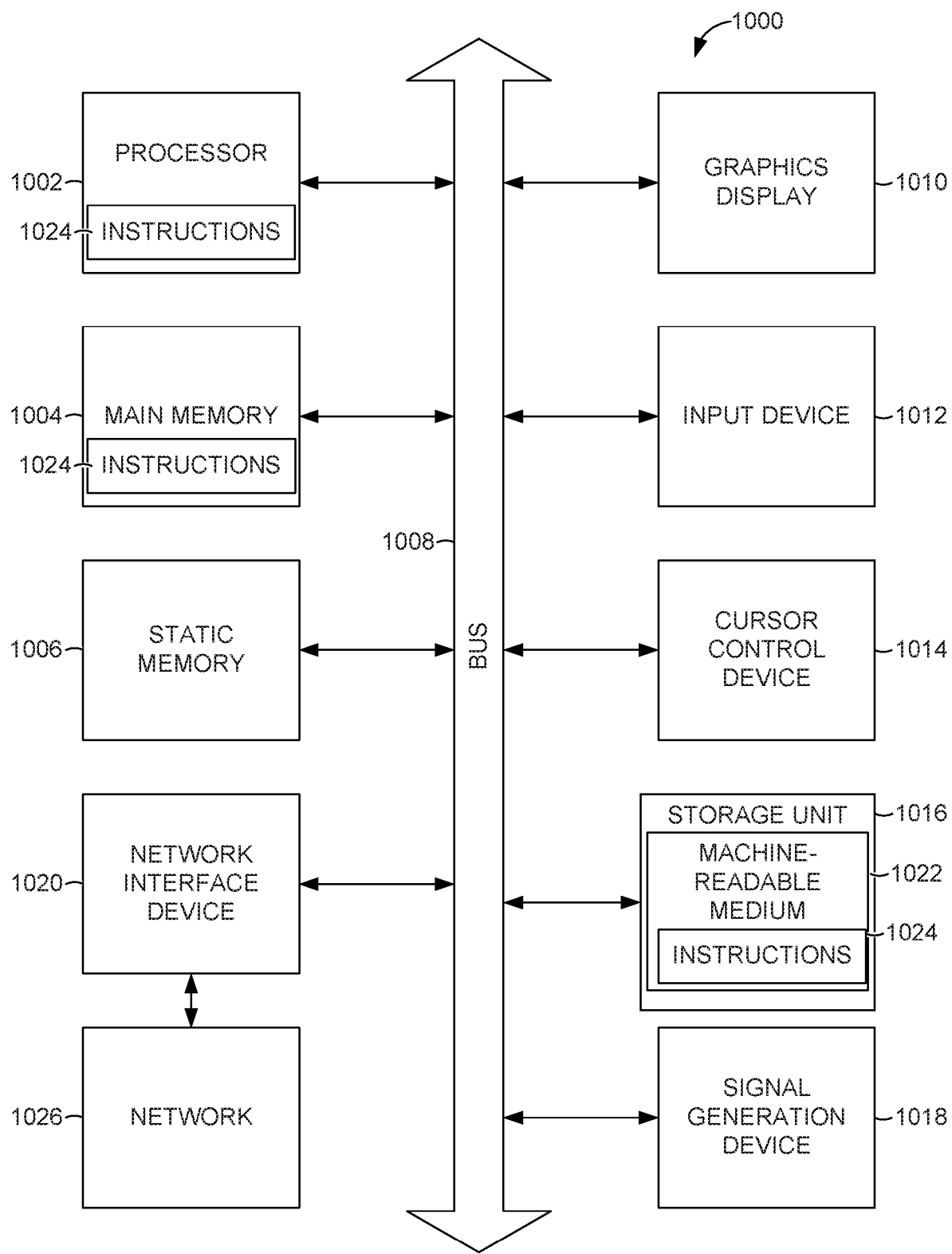
FIG. 10 is a diagrammatic representation of a machine in an example form of a computing system within which a set of instructions may be executed for causing the machine to perform any one or more of the methodologies discussed herein, according to an example embodiment.

FIG. 10 is a block diagram illustrating components of a machine 1000, according to some example embodiments, able to read instructions 1024 from a machine-storage medium 1022 and perform any one or more of the methodologies discussed herein, in whole or in part. Specifically, FIG. 10 shows the machine 1000 in the example form of a computer device (e.g., a computer) within which the instructions 1024 (e.g., software, a program, an application, an apples, an app, or other executable code) for causing the machine 1000 to perform any one or more of the methodologies discussed herein may be executed, in whole or in part.

For example, the instructions 1024 may cause the machine 1000 to execute the flows and flow diagrams of FIGS. 4 and 5. The instructions 1024 can transform the general, non-programmed machine 1000 into a particular machine (e.g., specially configured machine) programmed to carry out the described and illustrated functions in the manner described.

In alternative embodiments, the machine 1000 operates as a standalone device or may be connected (e.g., networked) to other machines. The machine 1000 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 1000 capable of executing the instructions 1024, sequentially or otherwise, that specify actions to be taken by that machine 1000. Further, while only a single machine 1000 is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, a signal generation device 1018 (e.g., a sound card, an amplifier, a speaker, a headphone jack, or any suitable combination thereof), and a network interface device 1020.

The storage unit 1016 includes the machine-storage medium 1022 on which are stored the instructions 1024 embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered machine-storage media 1022 (e.g., tangible and non-transitory machine-readable media).

In some example embodiments, the machine 1000 may be a portable computing device and have one or more additional input components (e.g., sensors or gauges). Examples of such input components include an image input component (e.g., one or more cameras an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" (referred to collectively as "machine-storage medium 1022") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1022 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1022 specifically exclude carrier waves, modulated data signals, and other such media, at least some of which are covered under the term "signal medium" discussed below. In this sense, a machine storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1024 may further be transmitted or received over a communications network 1026 using a transmission medium via the network interface device 1020 and utilizing any one of a number of well-known transfer protocols (e.g., HTTP). Examples of communication networks 1026 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" or "signal medium" shall be taken to include any intangible medium that is capable of storing, encoding, or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 1022 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1002 or a group of processors 1002) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a system for providing message recommendations. The system includes one or more processors and a storage medium storing instructions that, when executed by the one or more hardware processors, causes the one or more hardware processors to perform operations comprising machine training a prediction model associated with a user based, in part, on past review and response times for reviewing and responding to messages; generating, during runtime, a predicted user action time for each new message of the user based on the prediction model; tagging each new message received for the user with a corresponding predicted user action time; accessing, by the networked system, an available time for the user, the available time indicating an amount of time the user has available to read and respond to the new messages; determining an importance of each new message; based on the available time, the predicted user action time for each new message, and importance for each new message, determining a recommended set of new messages that the user should read and respond to during the available time, a sum of the predicted user action time of the recommended set of new messages being equal to or less than the available time; and causing presentation, on a user interface, of an indication of the recommended set of new messages, the recommended set of new messages being visually distinguished from non-recommended new messages.

In example 2, the subject matter of example 1 can optionally include wherein the operations further comprise ranking the new messages based on the importance of each new message prior to the determining of the recommended set of new messages.

In example 3, the subject matter of examples 1-2 can optionally include wherein the operations further comprise determining a context for each new message, wherein the determining a recommended set of new messages further comprises determining, based on the available time, the predicted user action time for each new message, importance for each new message, and the context for each new message.

In example 4, the subject matter of examples 1-3 can optionally include wherein the determining the context of each new messages comprises analyzing at least some of the new messages for one of location awareness, time awareness, artifact awareness, or people awareness.

In example 5, the subject matter of examples 1-4 can optionally include wherein the determining the context of each new message comprises accessing a virtual assistant which manages time and event reminders for the user.

In example 6, the subject matter of examples 1-5 can optionally include wherein accessing the available time for the user comprises receiving, via a specially configured messaging user interface, an indication of the available time from a smart time selection of the messaging user interface.

In example 7, the subject matter of examples 1-6 can optionally include wherein the determining the importance of each new message comprises making an API call to a separate system that determines importance of each message based on the features/properties of each of the new messages.

In example 8, the subject matter of examples 1-7 can optionally include wherein the machine training of the prediction model comprises generating a cluster of one or more users, including the user, based on a message reading and responding behavior of the cluster being similar; capturing, front reading and replying of past messages by the cluster, reading and reply signals for the cluster; analyzing the reading and reply signals to generate a ground truth label for each of the past messages of the cluster; determining a loss function by comparing the ground truth label for each of the past messages to predicted user action times for the past messages; and adjusting parameters of the prediction model to reduce the loss function.

In example 9, the subject matter of examples 1-8 can optionally include wherein the operations further comprise verifying that the loss function is below a predetermined threshold; and in response to the verifying that the loss function is below the predetermined threshold, providing the prediction model to a runtime system to apply during runtime.

Example 10 is a method for providing message recommendations. The method comprises machine training, by a hardware processor, a prediction model associated with a user based, in part, on past review and response times for reviewing and responding to messages; generating, during runtime, a predicted user action time for each new message of the user based on the prediction model; tagging each new message received for the user with a corresponding predicted user action time; accessing an available time for the user, the available time indicating an amount of time the user has available to read and respond to the new messages; determining an importance of each new messages; based on the available time, the predicted user action time for each new message, and importance for each new message, determining a recommended set of new messages that the user should read and respond to during the available time, a sum of the predicted user action time of the recommended set of new messages being equal to or less than the available time; and causing presentation, on a user interface, of an indication of the recommended set of new messages, the recommended set of new messages being visually distinguished from non-recommended new messages.

In example 11, the subject matter of example 10 can optionally include ranking the new messages based on the importance of each new message prior to the determining of the recommended set of new messages.

In example 12, the subject matter of examples 10-11 can optionally include determining a context for each new message, wherein the determining a recommended set of new messages further comprises determining, based on the available time, the predicted user action time for each new message, importance for each new message, and the context for each new message.

In example 13, the subject matter of examples 10-12 can optionally include wherein the determining the context of each new messages comprises analyzing at least some of the new messages for one of location awareness, time awareness, artifact awareness, or people awareness.

In example 14, the subject matter of examples 10-13 can optionally include wherein the determining the context of each new message comprises accessing a virtual assistant which manages time and event reminders for the user.

In example 15, the subject matter of examples 10-14 can optionally include wherein accessing the available time for the user comprises receiving, via a specially configured messaging user interface, an indication of the available time from a smart time selection of the messaging user interface.

In example 16, the subject matter of examples 10-15 can optionally include wherein the determining the importance of each new message comprises making an API call to a separate system that determines importance of each message based on the features/properties of each of the new messages.

In example 17, the subject matter of examples 10-16 can optionally include wherein the machine training of the prediction model comprises generating a cluster of one or more users, including the user, based on a message reading and responding behavior of the cluster being similar; capturing, from reading and replying of past messages by the cluster, reading and reply signals for the cluster; analyzing the reading and reply signals to generate a ground truth label for each of the past messages of the cluster; determining a loss function by comparing the ground truth label for each of the past messages to predicted user action times for the past messages; and adjusting parameters of the prediction model to reduce the loss function.

In example 18, the subject matter of examples 10-17 can optionally include verifying that the loss function is below a predetermined threshold; and in response to the verifying that the loss function is below the predetermined threshold, providing the prediction model to a runtime system to apply during runtime.

Example 19 is a machine-storage medium for providing message recommendations. The machine-storage medium configures one or more processors to perform operations comprising machine training a prediction model associated with a user based, in part, on past review and response times for reviewing and responding to messages; generating, during runtime, a predicted user action time for each new message of the user based on the prediction model; tagging each new message received for the user with a corresponding predicted user action time; accessing an available time for the user, the available time indicating an amount of time the user has available to read and respond to the new messages; determining an importance of each new messages; based on the available time, the predicted user action time for each new message, and importance for each new message, determining a recommended set of new messages that the user should read and respond to during the available time, a sum of the predicted user action time of the recommended set of new messages being equal to or less than the available time; and causing presentation, on a user interface, of an indication of the recommended set of new messages, the recommended set of new messages being visually distinguished from non-recommended new messages.

In example 20, the subject matter of example 19 can optionally include wherein the operations further comprise determining a context for each new message, wherein the determining a recommended set of new messages further comprises determining, based on the available time, the predicted user action time for each new message, importance for each new message, and the context for each new message.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
   one or more hardware processors; and
   a memory storing instructions that, when executed by the one or more hardware processors, cause the one or more hardware processors to perform operations comprising:
      generating, during runtime, a predicted user action time for each new message of a user based on a prediction model associated with the user, the prediction model being machine trained based, in part, on past review and response times for reviewing and responding to messages;
      tagging each new message received for the user with a corresponding predicted user action time;
      accessing, by the networked system, an available time for the user, the available time indicating an amount of time the user has available to read and respond to the new messages;
      identifying, via a scheduling assistant, one or more upcoming events of the user;
      identifying, based on context of each new message, messages related to the one or more upcoming events;
      based on the available time, the predicted user action time for each new message, and importance for each new message, ranking the new messages;
      based on the identified messages related to the one or more upcoming events, filtering the ranked messages to determine a recommended set of new messages that the user should read and respond to during the available time, the recommended set comprising at least some of the identified messages related to the one or more upcoming events that are contextually important, a sum of the predicted user action time of the recommended set of new messages being equal to or less than the available time; and causing presentation, on a user interface, of an indication of the recommended set of new messages and at least a portion of a selected message, the recommended set of new messages being visually distinguished from non-recommended new messages.

2. The system of claim 1, wherein the generating the predicted user action time comprises:
detecting one or more message features extracted from a new message;
determining, in real time, a value for each extracted message feature;
applying a corresponding parameter of the prediction model to each value of the one or more extracted message features; and
summing results of the applying.

3. The system of claim 1, wherein the operations further comprise determining the context for each new message.

4. The system of claim 3, wherein the determining the context of each new message comprises analyzing at least some of the new messages for location awareness, wherein a location-aware context of a new message comprises a future location within a predetermined timeframe.

5. The system of claim 3, wherein the determining the context of each new message comprises analyzing at least some of the new messages for time awareness, wherein a time-aware context indicates an upcoming event that is a meeting.

6. The system of claim 1, wherein accessing the available time for the user comprises receiving, from the user, an indication of an amount of time the user currently has available in an input field of a smart time selection displayed on the user interface.

7. The system of claim 1, wherein the operations further comprise determining the importance of each new message by making an API call to a separate system that determines importance of each message based on the features/properties of each of the new messages.

8. The system of claim 1, wherein the operations further comprise machine training the prediction module, wherein the machine training of the prediction model comprises:
generating a cluster of one or more users, including the user, based on a message reading and responding behavior of the cluster being similar;
capturing, from reading and replying of past messages by the cluster, reading and reply signals for the cluster;
analyzing the reading and reply signals to generate a ground truth label for each of the past messages of the cluster;
determining a loss function by comparing the ground truth label for each of the past messages to predicted user action times for the past messages; and
adjusting parameters of the prediction model to reduce the loss function.

9. The system of claim 8, wherein the operations further comprise:
verifying that the loss function is below a predetermined threshold; and
in response to the verifying that the loss function is below the predetermined threshold, providing the prediction model to a runtime system to apply during runtime.

10. A method comprising:
generating, during runtime, a predicted user action time for each new message of a user based on a prediction model associated with the user, the prediction model being machine trained based, in part, on past review and response times for reviewing and responding to messages;
tagging each new message received for the user with a corresponding predicted user action time;
accessing an available time for the user, the available time indicating an amount of time the user has available to read and respond to the new messages;
identifying, via a scheduling assistant, one or more upcoming events of the user;
identifying, based on context of each new message, messages related to the one or more upcoming events;
based on the available time, the predicted user action time for each new message, and importance for each new message, ranking the new messages;
based on the identified messages related to the one or more upcoming events, filtering the ranked messages to determine a recommended set of new messages that the user should read and respond to during the available time, the recommended set comprising at least some of the identified messages related to the one or more upcoming events that are contextually important, a sum of the predicted user action time of the recommended set of new messages being equal to or less than the available time; and
causing presentation, on a user interface, of an indication of the recommended set of new messages and at least a portion of a selected message, the recommended set of new messages being visually distinguished from non-recommended new messages.

11. The method of claim 10, wherein the generating the predicted user action time comprises:
detecting one or more message features extracted from a new message;
determining, in real time, a value for each extracted message feature;
applying a corresponding parameter of the prediction model to each value of the one or more extracted message features; and
summing results of the applying.

12. The method of claim 10, further comprising determining the context for each new message.

13. The method of claim 12, wherein the determining the context of each new message comprises analyzing at least some of the new messages for location awareness, wherein a location-aware context of a new message comprises a future location within a predetermined timeframe.

14. The method of claim 12, wherein the determining the context of each new message comprises analyzing at least some of the new messages for time awareness, wherein a time-aware context indicates an upcoming event that is a meeting.

15. The method of claim 10, wherein accessing the available time for the user comprises receiving, from the user, an indication of an amount of time the user currently has available in an input field of a smart time selection displayed on the user interface.

16. The method of claim 10, further comprising determining the importance of each new message by making an API call to a separate system that determines importance of each message based on the features/properties of each of the new messages.

17. The method of claim 10, further comprising machine training the prediction module, wherein the machine training of the prediction model comprises:
- generating a cluster of one or more users, including the user, based on a message reading and responding behavior of the cluster being similar;
- capturing, from reading and replying of past messages by the cluster, reading and reply signals for the cluster;
- analyzing the reading and reply signals to generate a ground truth label for each of the past messages of the cluster;
- determining a loss function by comparing the ground truth label for each of the past messages to predicted user action times for the past messages; and
- adjusting parameters of the prediction model to reduce the loss function.

18. The method of claim 17, further comprising:
- verifying that the loss function is below a predetermined threshold; and
- in response to the verifying that the loss function is below the predetermined threshold, providing the prediction model to a runtime system to apply during runtime.

19. A machine-storage medium storing instructions that, when executed by one or more processors of a machine, cause the one or more processors to perform operations comprising:
- generating, during runtime, a predicted user action time for each new message of a user based on a prediction model associated with the user, the prediction model being machine trained based, in part, on past review and response times for reviewing and responding to messages;
- tagging each new message received for the user with a corresponding predicted user action time;
- accessing an available time for the user, the available time indicating an amount of time the user has available to read and respond to the new messages;
- identifying, via a scheduling assistant, one or more upcoming events of the user;
- identifying, based on context of each new message, messages related to the one or more upcoming events;
- based on the available time, the predicted user action time for each new message, and importance for each new message, ranking the new messages;
- based on the identified messages related to the one or more upcoming events, filtering the ranked messages to determine a recommended set of new messages that the user should read and respond to during the available time, the recommended set comprising at least some of the identified messages related to the one or more upcoming events that are contextually important, a sum of the predicted user action time of the recommended set of new messages being equal to or less than the available time; and
- causing presentation, on a user interface, of an indication of the recommended set of new messages and at least a portion of a selected message, the recommended set of new messages being visually distinguished from non-recommended new messages.

20. The machine-storage medium of claim 19, wherein the operations further comprise determining a context for each new message, wherein the determining the context for each new message comprises analyzing at least some of the new messages for one of location awareness, time awareness, artifact awareness, or people awareness.

* * * * *